July 6, 1965
G. R. BRUEGGEMANN
3,193,208
STATOR WINDING MACHINES
Filed April 26, 1962
3 Sheets-Sheet 1
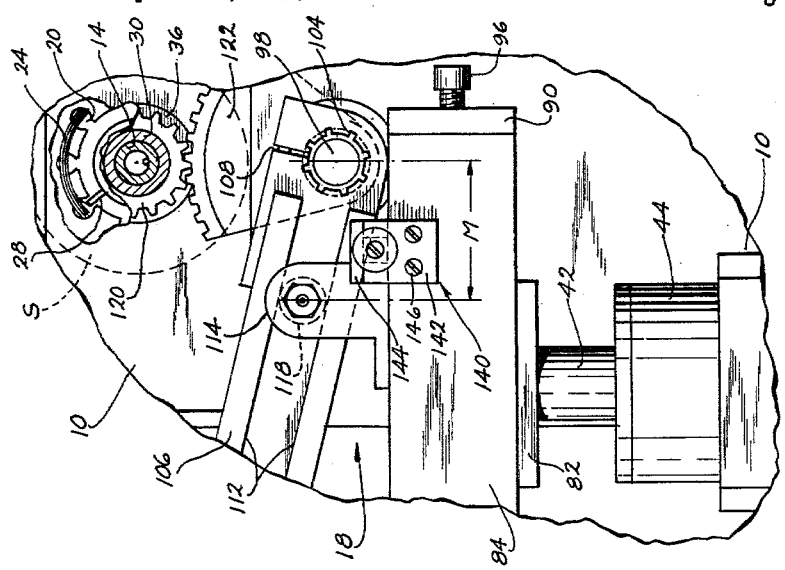
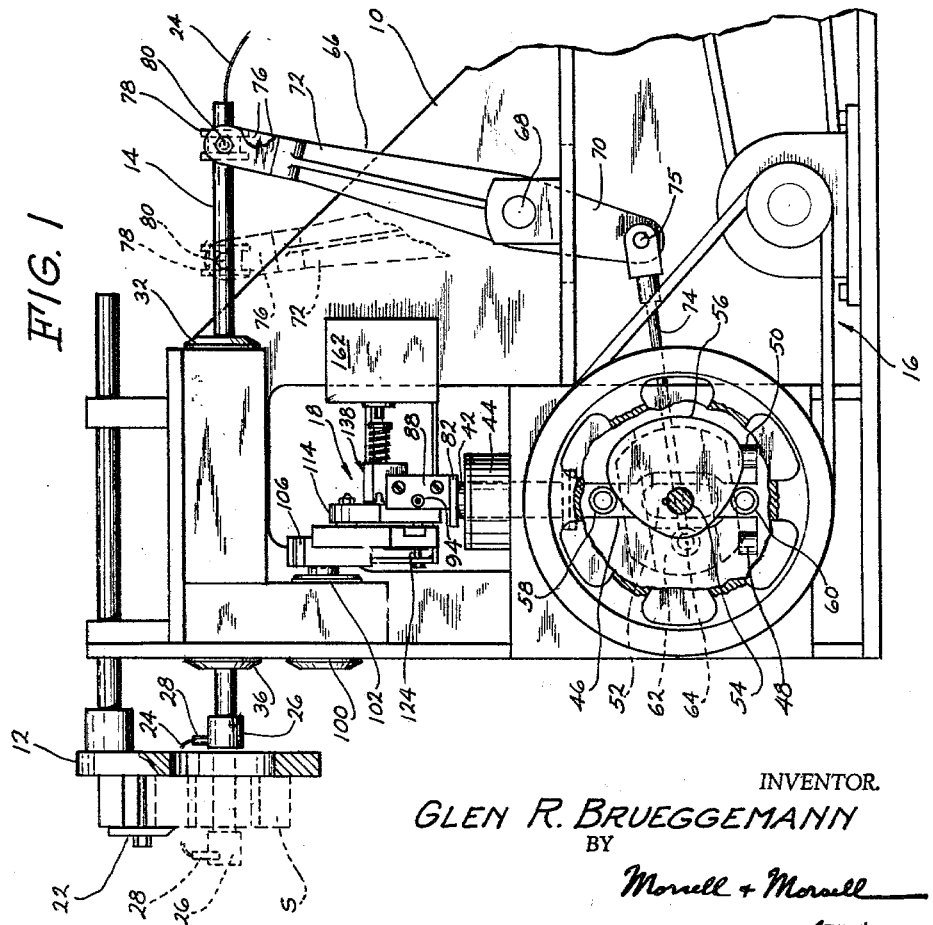
INVENTOR.
GLEN R. BRUEGGEMANN
BY
Morrell + Morrell
ATTY's.

July 6, 1965
G. R. BRUEGGEMANN
3,193,208
STATOR WINDING MACHINES
Filed April 26, 1962
3 Sheets-Sheet 2
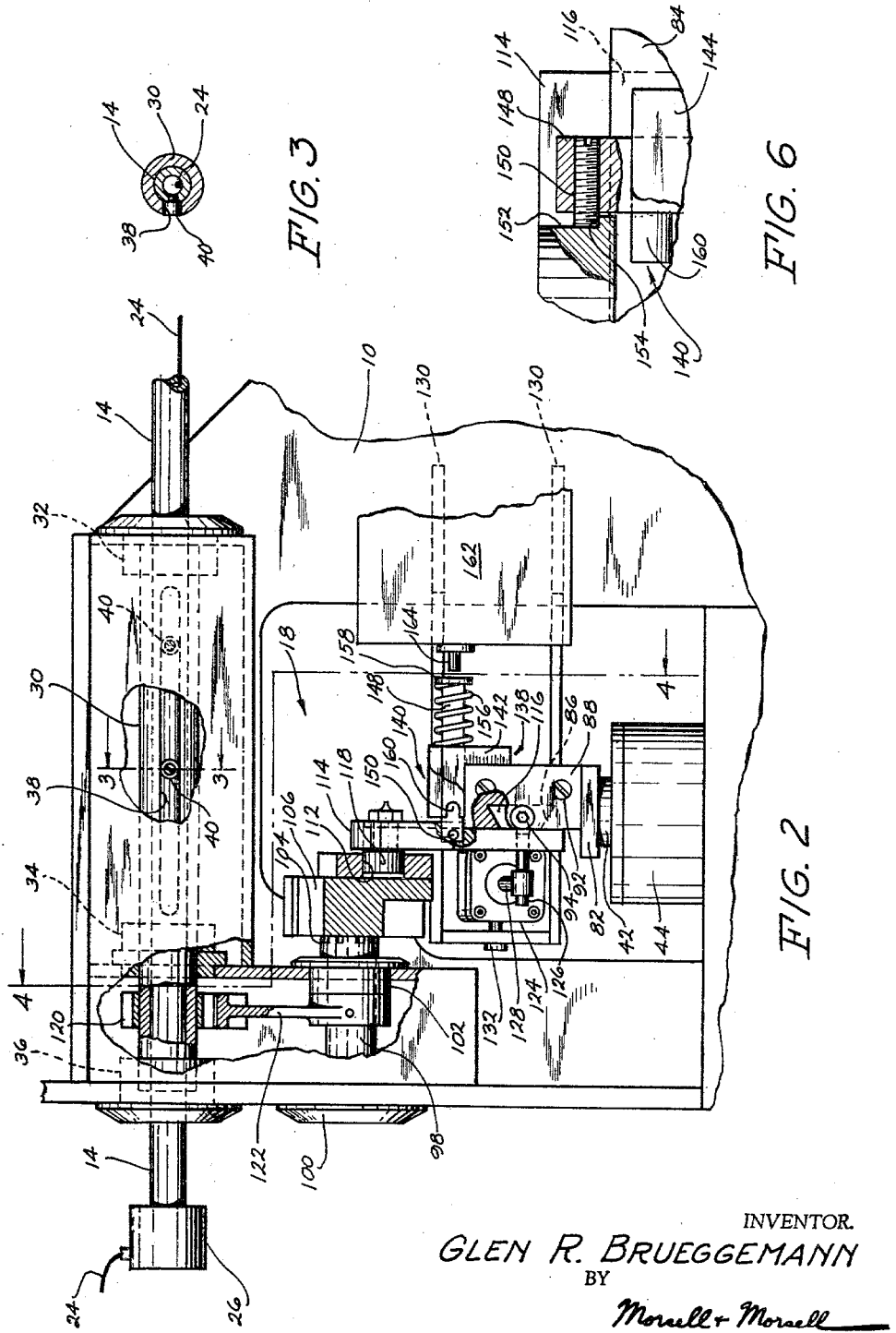
INVENTOR.
GLEN R. BRUEGGEMANN
BY
Morsell + Morsell
ATTY'S.

July 6, 1965  G. R. BRUEGGEMANN  3,193,208
STATOR WINDING MACHINES
Filed April 26, 1962  3 Sheets-Sheet 3
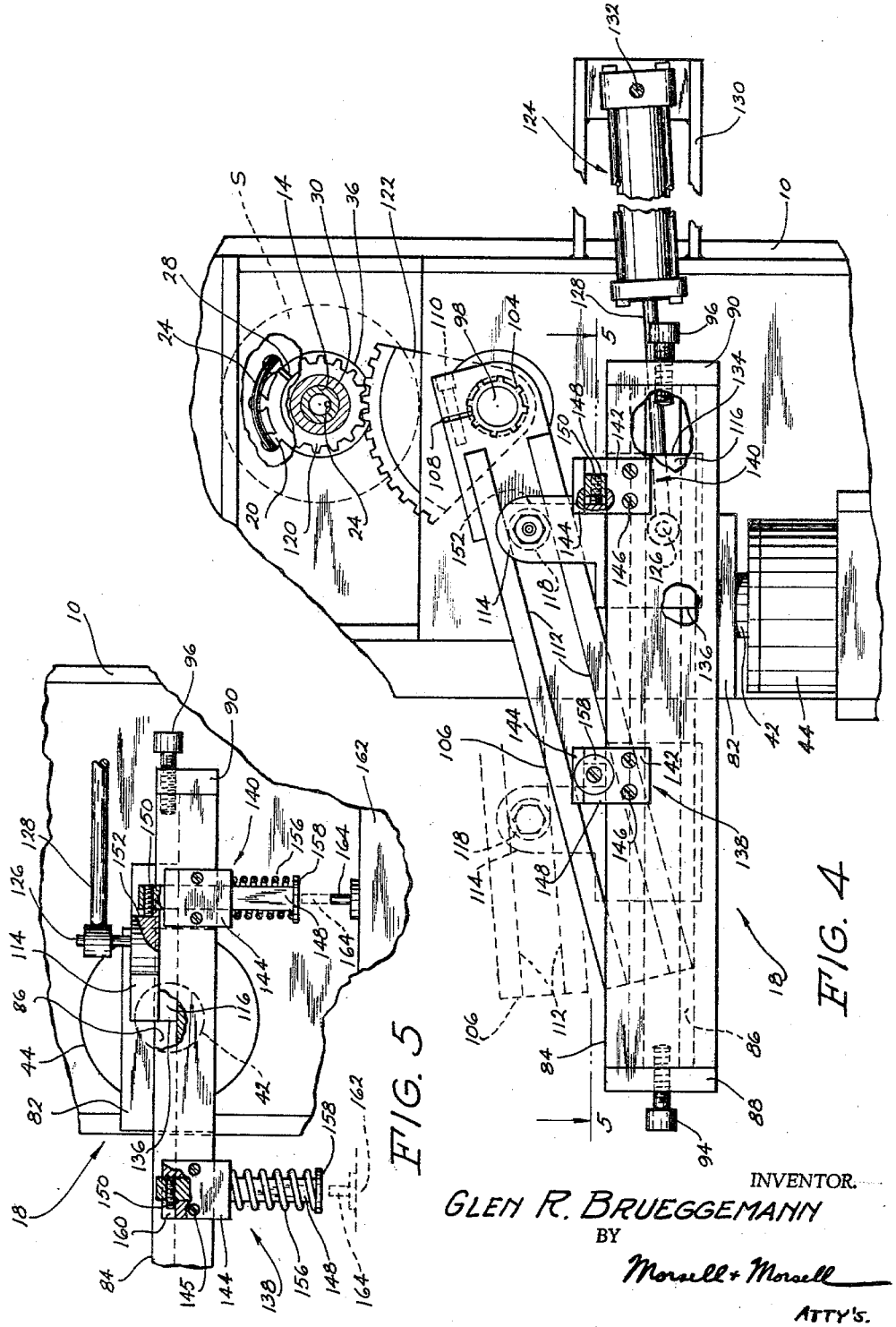
INVENTOR.
GLEN R. BRUEGGEMANN
BY
Morsell + Morsell
ATTY'S.

3,193,208
STATOR WINDING MACHINES
Glen R. Brueggemann, Kansasville, Wis.
(312 Depot St., Antioch, Ill.)
Filed Apr. 26, 1962, Ser. No. 190,463
2 Claims. (Cl. 242—1.1)

This invention relates to improvements in stator winding machines, and more particularly to an automatic stator winding machine which is characterized principally by improved, simplified shuttle and indexing means.

The general objects of the present invention are to provide a stator winding machine having simple and convenient means to change the angle of oscillation of the shuttle, having a plurality of alternate stations or positions to permit a rapid and accurate setting for the various angular spacings of stator slots, having means to accurately adjust the indexing mechanism in order to compensate for variations in the angular spacing of the stator slots being wound, and which improved machine is so designed that the mass of unbalanced moving parts therein is substatnially reduced, as compared to conventional stator winding machines, to minimize injurious vibrations.

Further objects and advantages of the invention will become apparent from a consideration of the following detailed description taken in connection with the accompanying drawings, wherein one operative embodiment of the invention is shown. It is to be understood, however, that the invention is not limited to the structural details illustrated and described but includes all such variations and modifications therein as fall within the spirit of the invention and within the scope of the claims appended hereto.

In the accompanying drawings, wherein the same reference numerals designate the same parts in all of the views:

FIG. 1 is a side elevational view of a stator winding machine embracing the invention, with parts thereof broken away to show hidden details;

FIG. 2 is an enlarged, fragmentary side elevational view with some parts broken away to show hidden details more clearly;

FIG. 3 is a sectional view taken along line 3—3 of FIG. 2;

FIG. 4 is a transverse sectional view taken along line 4—4 of FIG. 2;

FIG. 5 is a plan view taken in the direction of line 5—5 of FIG. 4, with some details omitted;

FIG. 6 is an enlarged fragmentary view of a portion of the structure illustrated in FIG. 5, parts thereof being broken away and shown in section; and FIG. 7 is an elevational view of a portion of FIG. 4 but illustrating the index means in its extreme upwardly-extended position.

With more particular reference now to the drawings, it will be seen that the improved stator winding machine comprising the present invention includes a frame 10 which carries a stator-supporting plate 12 (FIG. 1), a shuttle 14, driving means 16, and shuttle-oscillating means 18. A stator S, having slots 20 into which wire is to be wound, is mounted on the plate 12 and is held thereon by suitable means such as the illustrated clamps 22.

Said shuttle 14 is tubular, to permit threading of wire 24 therethrough, and a shuttle head 26 is secured to the forward end of said shuttle, said shuttle head being provided with a radial feed tube 28 from which wire 24 emerges to be wound in the stator slots 20. Said wire 24 is supplied to the shuttle 14 from a reel (not shown) which includes suitable means for maintaining the wire under proper tension. In operation, said shuttle 14 alternately reciprocates axially and oscillates, so as to thread the wire 24 in the form of a closed coil within each of the slots 20 of the stator.

As best appears in FIG. 2, the shuttle 14 is supported for reciprocation within a sleeve 30. Said sleeve is journalled in the frame 10 and is prevented from axial displacement by bearings 32, 34 and 36. In addition to sliding axially within the sleeve 30, as described, said shuttle 14 is also keyed to said sleeve so as to rotate with the latter. The preferred keying arrangement comprises a longitudinal slot 38 machined in said sleeve 30, and a pair of guide rollers 40 are slidably fitted in said slot and are secured to the shuttle 14 by a suitable means permitting the same to rotate freely. This arrangement permits the shuttle 14 to reciprocate axially within the sleeve 30 while simultaneously compelling the same to rotate with said sleeve about their common axis.

The shuttle-oscillating means 18 employed in the present invention comprises a support pillar 42 which is slidingly-fitted in portion 44 of the frame 10, and which support extends downwardly as shown in FIG. 1. Said support pillar terminates in a yoke 46 and is guided by posts 48 and 50 which are anchored in the frame 10. Said yoke 46 is bifurcated as at 52 to embrace a drive shaft 54 which passes through the bifurcation and permits reciprocation of said pillar. Said drive shaft 54 is provided with suitable journals which are conventional and need not be shown.

Keyed to the drive shaft 54 is a cam 56 (FIG. 1) of a suitable contour, and a pair of cam-follower rollers 58 and 60 are journalled on the yoke 46 and are in engagement with said cam 56, thus providing means whereby said yoke 46 will be reciprocated by the rotation of the shaft 54. A crank 62 is also keyed to the drive shaft 54 and carries a crank pin 64 which is adjustable for throw so as to permit changing the length of axial travel of shuttle 14 to accommodate stators of various lengths.

With reference again to FIG. 1, it will be seen that a lever arm 66 is pivoted to the frame 10 on a pin 68, said arm being provided with a downwardly-extending portion 70 and an upwardly-extending portion 72. A pitman or connecting rod 74 is pivotally connected to the lower end 70 of said lever arm by a pin 75, and the opposite end of said connecting rod is journalled on a crank pin 64. The upper end 72 of said lever arm is bifurcated as at 76 so as to embrace the shuttle 14, and secured integrally to said shuttle intermediate said bifurcations 76 is a grooved collar 78. Two pivot studs 80 are provided, one in each bifurcation, to fit freely in the groove of said collar 78, and studs 80 are provided to compel said shuttle 14 to reciprocate axially within the sleeve 30 in response to movement of said lever arm 66 about its pivot connection 68.

The aforementioned support pillar 42 forms a base on which the shuttle-oscillating mechanism is mounted, and which embraces the novel indexing means of this invention. In this respect, a support plate 82 is mounted on the top of said pillar 42 in a suitable manner, and a fulcrum-carrying beam 84 is secured to said plate and is provided with a longitudinal "dovetail" slot 86. Each end of said beam 84 is provided with a cap such as 88 and 90, there being screws 92 to secure said caps to the end of said beam, and stop screws 94 and 96 are threaded into said caps 88 and 90, respectively, to serve as index-station stops, and will be referred to later.

A rockshaft 98 is mounted in journals 100 and 102 on an axis spaced from the axis of the sleeve 30, as is shown in FIGS. 2, 4 and 7, and said shaft 98 is provided with splines 104 at the end thereof. Mounted on said rockshaft 98 adjacent the beam 84 is a rocker arm 106 having a bore provided with splines corresponding to said splines 104 in said shaft 98. A slit 108 is provided to permit the clamping of said rocker arm 106 to the shaft 98 by means of one or more fastening screws 110. Said arm 106 is provided with a longitudinal track 112 on the face thereof for a purpose which will presently be explained.

A fulcrum post 114 is positioned adjacent the face of the beam 84 and is provided with a block 116 conforming to the "dovetail" slot 86, said fulcrum post being slidable therein to permit its shifting along said beam 84. Said fulcrum post 114 is provided with a freely-rotating guide roller which is an accurate rolling fit in the aforementioned track 112 of rocker arm 106. A gear pinion 120 is keyed or otherwise secured to the sleeve 30 so as to rotate with said sleeve, and a gear quadrant 122 is keyed or otherwise fastened to the rocker shaft 98 and is positioned so as to be in mesh with said pinion 120.

The fulcrum post 114 is shiftable to various stations or positions along the beam 84 by means of a double-acting cylinder 124, said fulcrum post being provided with a pin 126 which forms the pivot for the eyelet of the piston rod 128. Said cylinder 124 is pivoted to a frame 130 on a pair of trunnions 132, as shown, and said frame is welded or otherwise secured to the main frame 10. The usual hydraulic connections to each end of the cylinder 124 are conventional and have not therefore been illustrated.

A number of stations are established along and at the extremities of said beam 84, as described, and in the use of the present machine the post 114 can be selectively positioned therein to provide various angles of oscillation of the shuttle 14 corresponding to the included angle between two stator slots being wound. In the illustrated form of the invention stop screws 94 and 96 are provided to determine the minimum and maximum angles of oscillation of said shuttle 14, which in this instance is 30 degrees and 180 degrees, respectively, and said screws 94 and 96 may be rotated to make corrections for slight errors in angular spacing of the stator slots. Thus, when setting the fulcrum post 114 to the proper position for winding a coil in slots spaced at 180 degrees, the cylinder 124 is actuated so as to bring the face 134 of block 116 into contact with the screw 96. Similarly, when setting the post 114 for a 30 degree angle between slots, said cylinder 124 is actuated to bring the face 136 of said block 116 into contact with the other stop screw 94. It is obvious, of course, that intermediate angles between 30 degrees and 180 degrees will occur when winding stators, so additional stations must be provided. In this regard, while only the two extreme stations 138 and 140 are shown, it is within the purview of this invention to add any desired number of additional stations. Moreover, while only one of such stations will now be described in detail, it is to be understood that the others are identical in construction and function.

Station 140 comprises a stop bracket 142 secured to the beam 84 by screws 146, and a cap 144 secured to said bracket by screws 145. A sliding plunger 148 is fitted into a slot in said bracket 142, and threaded into said plunger is a transverse stop screw 150. As shown in FIG. 6, the fulcrum post 114 has a stop-face 152 and a lip 154, and said stop screw 150 abuts the face 152 to determine the position of said fulcrum relative to the stop station along beam 84, said screw being adjustable to compensate for variations in angular spacing of the stator slots being wound. In its abutting position, and as illustrated in FIG. 6, said screw 150 engages the fulcrum post lip 154. There is a coil spring 156 surrounding the plunger 148, and a retaining cap 158 provides means to maintain said spring 156 in compression between the bracket 142 and said cap, thus urging the plunger 148 in the direction to bias the screw 150 into contact with said lip 154. When a station such as 138 or 140 is not being used, the screw 150 withdraws into a notch 160, as shown in FIGS. 2 and 5, by virtue of the force of said spring 156. This ensures that the end of said plunger 148 will clear the face of beam 84 and permit the post 114 to pass along said beam unobstructed. This position of the plunger 148 is shown with respect to station 138 in FIG. 5. A suitable solenoid means 162 is mounted on the main frame 10 to actuate said plunger 148 in the manner shown in FIG. 5.

In the operation of the improved stator winding machine comprising the present invention, the rotation of the shaft 54, by driving means 16, rotates the cam 56 and crank 62. Said cam 56 has a contour that is designed to reciprocate the pillar 42 only during the period when said crank 62 is at "dead center" and the shuttle 14 is near either extremity of its reciprocation. Said cam 56 is also provided with "dwell" so that said shuttle 14 remains at a fixed angle relative to the stator slot while it is reciprocating and threading the wire 24 through said stator slot.

The determining factor in the location of the fulcrum post 114 is the distance M shown in FIG. 7, which is adjusted to agree with the positions of the stator slots. Also controlling is the ratio of the pitch diameter of the pinion 120 to that of the quadrant 122. These details are arbitrary and are influenced by other details when designing the machine and do not concern the novel structure incorporated in the present invention. The screw 150 is also initially adjusted in contact with face 152 to correct any error of agreement between the oscillating path of the wire feed tube 28 and the stator slot.

When starting to wind a coil through two slots of a stator, the wire is first secured to a fixed part of the stator. To properly initially locate the fulcrum post 114 the cylinder 124 is actuated to shift said post to the approximate position and, in the instance of station 138 or 140, beyond the final position. The solenoid 162 is then actuated to shift the plunger 148 to a position to intercept the return of said post 114, and while the solenoid holds said plunger in this position, the cylinder 124 is adjusted to bring the face 152 of the post into engagement with the screw 150. The solenoid plunger 164 is then withdrawn to permit the screw 150 to be drawn into contact with the lip 154. Thus the plunger 148 will remain in this position during the winding operation.

When it is desired to change the winding angle, the cylinder 124 may be actuated to extend the piston rod and to thereby release the plunger 148, said plunger being withdrawn by spring 156 to a position beyond the face of the beam 84, and the positioning operation is repeated with respect to the next station. The stations at the screws 94 and 96 are brought into play merely by actuating the cylinder 124 until either faces 136 or 134 contact their respective screws, as described.

From the foregoing detailed description it will be seen that the present invention provides an improved stator winding machine which has several important advantages over prior machines. Principally, of course, the present machine is characterized by its novel shuttle and indexing mechanisms. With the present assembly simple and convenient means are provided for changing the angle of oscillation of the shuttle, a plurality of stations or positions are provided to permit the fast and accurate setting of the unit for various angular spacings of stator slots, and means are provided to accurately adjust the indexing mechanism to compensate for variations in the angular spacing of the stator slots being wound. Moreover, with the present improved design the mass of unbalanced moving parts therein is substantially reduced, as compared to conventional stator winders, and the injurious vibrations characterizing such prior machines is eliminated.

As hereinabove mentioned, it is to be understood that the improved stator winding machine includes not only the embodiment illustrated and hereinabove described, but any and all changes or modifications therein which do not depart from the spirit of said invention. It is contemplated, for example, that numerous structural changes to adapt the unit for particular uses will undoubtedly occur to those skilled in the art after reading the foregoing description, and it is intended to include herein all of such changes as may come within the scope of the following claims.

What I claim is:

1. In a stator winding machine having a wire carrying shuttle and having means for reciprocating and oscillating said shuttle to wind wire in preselected spaced pairs of receiving slots in a stator core, the improved adjustable oscillating means comprising: a rotatable sleeve surrounding said shuttle, said shuttle being movable axially within said sleeve and being keyed to rotate therewith; a rotatable oscillating shaft mounted below and in parallel relation to said shuttle and sleeve assembly; means on said oscillating shaft rotatably drivingly engaging said sleeve; a vertically-movable support pillar positioned with its upper end below said oscillating shaft; power means to reciprocate said pillar; a horizontal beam mounted on the top of said vertically-movable pillar and positioned transversely to the axis of said oscillating shaft; a movable, elongated rocker arm adjacent said beam, said arm having a free outer end and having an inner end secured in keyed relation to said oscillating shaft; a post member having an upper portion connected to and longitudinally shiftable along said rocker arm, and having a lower portion longitudinally shiftably mounted on said beam; a double acting ram connected to said post member and adapted to shift the same longitudinally on said beam; a pair of adjustable stops at the opposite ends of said beam limiting the longitudinal movement of said post thereon; and a plurality of index station stops positioned along said beam, said stops being independently operable to intercept said post at predetermined locations along said beam, the positioning of said post on the beam determining the force point on the rocker arm, and consequent distance said arm and the oscillating shaft revolve during vertical movement of the pillar, thereby permitting adjustment of the oscillating angle of the shuttle and sleeve assembly connected therewith to correspond to the requirement of the particular pair of stator core slots to be wound.

2. The apparatus recited in claim 1 wherein each of said index station stops includes: a bracket secured on said beam; a plunger slidably mounted in said bracket, said plunger being movable from a retracted position to an extended position wherein it blocks the longitudinal travel of said post member; a compression spring surrounding said plunger and yieldably maintaining the same in its retracted position; solenoid actuated means for extending said stop plunger; and means for releasably maintaining said plunger in its extended position.

References Cited by the Examiner

UNITED STATES PATENTS

| 2,143,537 | 1/39 | Bliss | 74—104 |
| 2,244,350 | 6/41 | Sugden et al. | 74—98 |
| 2,541,790 | 2/51 | Sugden et al. | 74—99 |
| 2,569,679 | 10/51 | Leece et al. | 242—1.1 |
| 2,586,020 | 2/52 | Fry | 74—104 |
| 2,694,934 | 11/54 | Fry | 74—104 |
| 2,770,424 | 11/56 | Grove | 242—1.1 |
| 3,052,418 | 9/62 | Gorski et al. | 242—1.1 |

MERVIN STEIN, *Primary Examiner.*

HARRISON R. MOSELEY, *Examiner.*